United States Patent
Kim et al.

(10) Patent No.: US 11,184,791 B2
(45) Date of Patent: Nov. 23, 2021

(54) ACCESS CONTROL METHOD AND DEVICE FOR SUPPORTING SAME

(71) Applicant: LG Electronics Inc., Seoul (KR)

(72) Inventors: Seokjung Kim, Seoul (KR); Jian Xu, Seoul (KR); Daewook Byun, Seoul (KR)

(73) Assignee: LG Electronics Inc., Seoul (KR)

( * ) Notice: Subject to any disclaimer, the term of this patent is extended or adjusted under 35 U.S.C. 154(b) by 128 days.

(21) Appl. No.: 16/495,247

(22) PCT Filed: Mar. 21, 2018

(86) PCT No.: PCT/KR2018/003255
§ 371 (c)(1),
(2) Date: Sep. 18, 2019

(87) PCT Pub. No.: WO2018/182224
PCT Pub. Date: Oct. 4, 2018

(65) Prior Publication Data
US 2020/0015112 A1 Jan. 9, 2020

Related U.S. Application Data

(60) Provisional application No. 62/476,747, filed on Mar. 25, 2017.

(51) Int. Cl.
*H04W 28/02* (2009.01)
*H04W 76/34* (2018.01)
(Continued)

(52) U.S. Cl.
CPC ....... *H04W 28/0221* (2013.01); *H04W 48/04* (2013.01); *H04W 76/27* (2018.02); *H04W 76/34* (2018.02)

(58) Field of Classification Search
CPC .......................... H04W 28/0221; H04W 76/34
See application file for complete search history.

(56) References Cited

U.S. PATENT DOCUMENTS

| 10,321,507 | B2* | 6/2019 | Lee | H04W 76/18 |
| 10,420,067 | B2* | 9/2019 | Hong | H04W 76/27 |

(Continued)

FOREIGN PATENT DOCUMENTS

WO 2016021922 2/2016

OTHER PUBLICATIONS

LG Electronics Inc., "Connection Establishment for Standalone NR," R2-168419, 3GPP TSG RAN WG2 #96, Reno, USA, Nov. 4, 2016, see pp. 1-2.

(Continued)

*Primary Examiner* — Parth Patel
(74) *Attorney, Agent, or Firm* — Dentons US LLP (57) ABSTRACT

Provided are a method by which a base station controls the access of a terminal, and a device for supporting the same. The method comprises the steps of: receiving, from a core network, information on an RRC connection procedure in which access in an RRC inactive state is restricted; receiving a request for executing the RRC connection procedure from a terminal which is in the RRC inactive state; and transmitting, to the terminal, a message notifying that the requested execution of the RRC connection procedure has been restricted, when the RRC connection procedure requested from the terminal corresponds to the RRC connection procedure in which the access is restricted.

8 Claims, 7 Drawing Sheets

(51) Int. Cl.
*H04W 76/27* (2018.01)
*H04W 48/04* (2009.01)

(56) References Cited

U.S. PATENT DOCUMENTS

| | | | |
|---|---|---|---|
| 10,506,489 B2* | 12/2019 | Vrzic | H04W 36/26 |
| 2009/0131063 A1 | 5/2009 | Yi et al. | |
| 2009/0238143 A1* | 9/2009 | Mukherjee | H04W 36/0022 370/331 |
| 2009/0303971 A1* | 12/2009 | Kim | H04W 76/12 370/338 |
| 2012/0302196 A1* | 11/2012 | Chin | H04W 76/25 455/404.1 |
| 2013/0039287 A1* | 2/2013 | Rayavarapu | H04W 72/042 370/329 |
| 2013/0045706 A1* | 2/2013 | Hsu | H04W 48/02 455/404.1 |
| 2014/0128029 A1* | 5/2014 | Fong | H04W 28/0284 455/411 |
| 2014/0301200 A1* | 10/2014 | Miura | H04W 28/08 370/235 |
| 2014/0301344 A1* | 10/2014 | Lee | H04W 74/0833 370/329 |
| 2015/0250007 A1 | 9/2015 | Ramkull | |
| 2016/0286464 A1* | 9/2016 | Wiemann | H04W 48/02 |
| 2017/0118693 A1* | 4/2017 | Tsuboi | H04W 48/02 |
| 2017/0238278 A1* | 8/2017 | Yadav | H04W 68/04 370/329 |
| 2017/0251396 A1* | 8/2017 | Centonza | H04W 28/0289 |
| 2017/0303186 A1* | 10/2017 | Centonza | H04W 76/10 |
| 2017/0374613 A1* | 12/2017 | Ianev | H04W 8/065 |
| 2018/0139778 A1* | 5/2018 | Chou | H04W 74/04 |
| 2018/0212710 A1* | 7/2018 | Ronneke | H04L 1/0002 |
| 2018/0213452 A1* | 7/2018 | Kim | H04L 5/0091 |
| 2018/0220487 A1* | 8/2018 | Wu | H04W 76/27 |
| 2018/0255484 A1* | 9/2018 | Wu | H04B 7/0413 |
| 2018/0262924 A1* | 9/2018 | Dao | H04W 72/1257 |
| 2018/0262952 A1* | 9/2018 | Pani | H04W 80/02 |
| 2019/0141563 A1* | 5/2019 | Ianev | H04W 28/065 |
| 2019/0174536 A1* | 6/2019 | Han | H04W 74/002 |
| 2019/0223093 A1* | 7/2019 | Watfa | H04W 36/06 |
| 2019/0239188 A1* | 8/2019 | Wang | H04W 76/30 |
| 2019/0246342 A1* | 8/2019 | Wang | H04W 68/005 |
| 2019/0274182 A1* | 9/2019 | Jia | H04W 72/0446 |
| 2019/0320476 A1* | 10/2019 | Wang | H04W 28/0268 |
| 2019/0349774 A1* | 11/2019 | Lou | H04W 48/08 |
| 2019/0349818 A1* | 11/2019 | Li | H04W 52/0229 |
| 2019/0349843 A1* | 11/2019 | Choi | H04W 48/02 |
| 2020/0015112 A1* | 1/2020 | Kim | H04W 48/02 |
| 2020/0022214 A1* | 1/2020 | Takahashi | H04W 74/0833 |
| 2020/0029326 A1* | 1/2020 | Wang | H04W 56/0045 |
| 2020/0037203 A1* | 1/2020 | Ianev | H04W 28/06 |
| 2020/0037345 A1* | 1/2020 | Ryoo | H04W 76/27 |
| 2020/0068646 A1* | 2/2020 | Kwon | H04W 68/02 |
| 2020/0092842 A1* | 3/2020 | Kim | H04W 76/10 |
| 2020/0163148 A1* | 5/2020 | Futaki | H04W 36/0072 |
| 2020/0404617 A1* | 12/2020 | Murray | H04W 68/02 |
| 2020/0413472 A1* | 12/2020 | Huang | H04W 72/0486 |

OTHER PUBLICATIONS

Kddi, "Finer Granularity of NR RRC Establishment Cause," R2-1701656, 3GPP TSG RAN WG2 Meeting #97, Athens, Greece, Feb. 3, 2017, see pp. 1-2.

* cited by examiner

ACCESS CONTROL METHOD AND DEVICE FOR SUPPORTING SAME

This application is the National Stage filing under 35 U.S.C. 371 of International Application No. PCT/KR2018/003255, filed on Mar. 21, 2018, which claims the benefit of U.S. Provisional Application No. 62/476,747 filed on Mar. 25, 2017, the contents of which are all hereby incorporated by reference herein in their entirety.

BACKGROUND OF THE DISCLOSURE

Field of the Disclosure

The present disclosure relates to a technology for controlling access of a user equipment (UE) in which an evolved node B (eNB) is in an RRC inactive state in NR.

Related Art

In order to meet the demand for wireless data traffic since the 4th generation (4G) communication system came to the market, there are ongoing efforts to develop enhanced 5th generation (5G) communication systems or pre-5G communication systems. For the reasons, the 5G communication system or pre-5G communication system is called the beyond 4G network communication system or post long-term evolution (LTE) system.

Meanwhile, in order to uniformly manage an operation state of a UE, an upper layer standard defines a protocol state and presents detailed functions and procedures of the UE. In discussion of NR standardization, an RRC state is defined as an RRC_CONNECTED state and an RRC_IDLE state, and introduction of an RRC_INACTIVE state is further considered.

Meanwhile, in the RRC inactive state of the NR, the UE can generate minimal signaling, minimize power consumption, and reduce resource costs in the RAN and the core network. However, in the NR, such effects can be obtained, and at the same time, the core network should maintain the NG connection corresponding to the UE in the RRC inactive state, to thereby fall into a severely overloaded state. Therefore, there is a need for an improved overload control procedure for coordinating access of an RRC inactive UE in an overloaded state.

SUMMARY OF THE DISCLOSURE

In order to prevent an overload state or cope with an overload state, it is necessary to restrict access of an RRC inactive UE. However, since the RRC inactive state is set by the base station instructing each UE, it is difficult for the core network to grasp the actual RRC state of each UE.

In an aspect, there is provided a method of controlling, by a base station, an access of a user equipment (UE), in a wireless communication system. The method includes: receiving, from a core network, information on a certain RRC connection procedure to which an access in an RRC inactive state is restricted; receiving, from the UE in the RRC inactive state, a request to perform a specific RCC connection procedure; and, if the specific RRC connection procedure corresponds to the certain RRC connection procedure to which the access is restricted, transmitting a message indicating that performance of the specific RRC connection procedure is restricted.

Herein, the information on the certain RRC connection procedure may include a cause value related to the RRC connection procedure.

Herein, the cause value may indicate at least one of a paging area update (pAreaUpdate), a RAN-based area update (ranAreaUpdate), mo-data, mo-signal, and early data transmission.

Herein, the RRC connection procedure may be any one of a RRC connection establishment procedure and an RRC connection resumption procedure.

The method may further include, after receiving information on the certain RRC connection procedure to which the access is restricted, receiving, from the core network, a message indicating to release the restriction of the access to the certain RRC connection procedure.

Herein, the message may include a timer indicating a time when the performance of the specific RRC connection procedure is stopped.

The base station may be a next-generation-radio access network (NG-RAN).

The core network may be a next generation core (NGC).

In another aspect, there is provided a base station for controlling an access to a user equipment (UE), in a wireless communication system. The base station includes: a memory; a transceiver; and a processor configured to connect the memory with the transceiver, in which the processor is configured to: receive, from a core network, information on a certain RRC connection procedure to which an access in an RRC inactive state is restricted; receive, from the UE in the RRC inactive state, a request to perform a specific RCC connection procedure; and, if the specific RRC connection procedure corresponds to the certain RRC connection procedure to which the access is restricted, transmit a message indicating that performance of the specific RRC connection procedure is restricted.

Herein, the information on the certain RRC connection procedure may include a cause value related to the RRC connection procedure.

Herein, the cause value may indicate at least one of a paging area update (pAreaUpdate), a RAN-based area update (ranAreaUpdate), mo-data, mo-signal, and early data transmission.

Herein, the RRC connection procedure may be any one of a RRC connection establishment procedure and an RRC connection resumption procedure.

Herein, after receiving information on the certain RRC connection procedure to which the access is restricted, the processor may be configured to receive, from the core network, a message indicating to release the restriction of the access to the certain RRC connection procedure.

Herein, the message may include a timer indicating a time when the performance of the specific RRC connection procedure is stopped.

Herein, the base station may be a next-generation-radio access network (NG-RAN).

According to an embodiment of the disclosure, the core network may control the access of the UE in the RRC inactive state with the help of the base station without having to check whether the RRC is inactive for each UE. According to the degree of overload, the core network may adjust the rate at which the base station can establish the RRC connection or resume the RRC connection in the RRC inactive state. In this way, the core network may prevent an overload condition that may be caused by the UE in the RRC inactive state or cope with the overload condition.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE. 5G is an evolution of the LTE-A.

For clarity, the following description will focus on LTE-A/5G. However, technical features of the present disclosure are not limited thereto.

Figure 1:
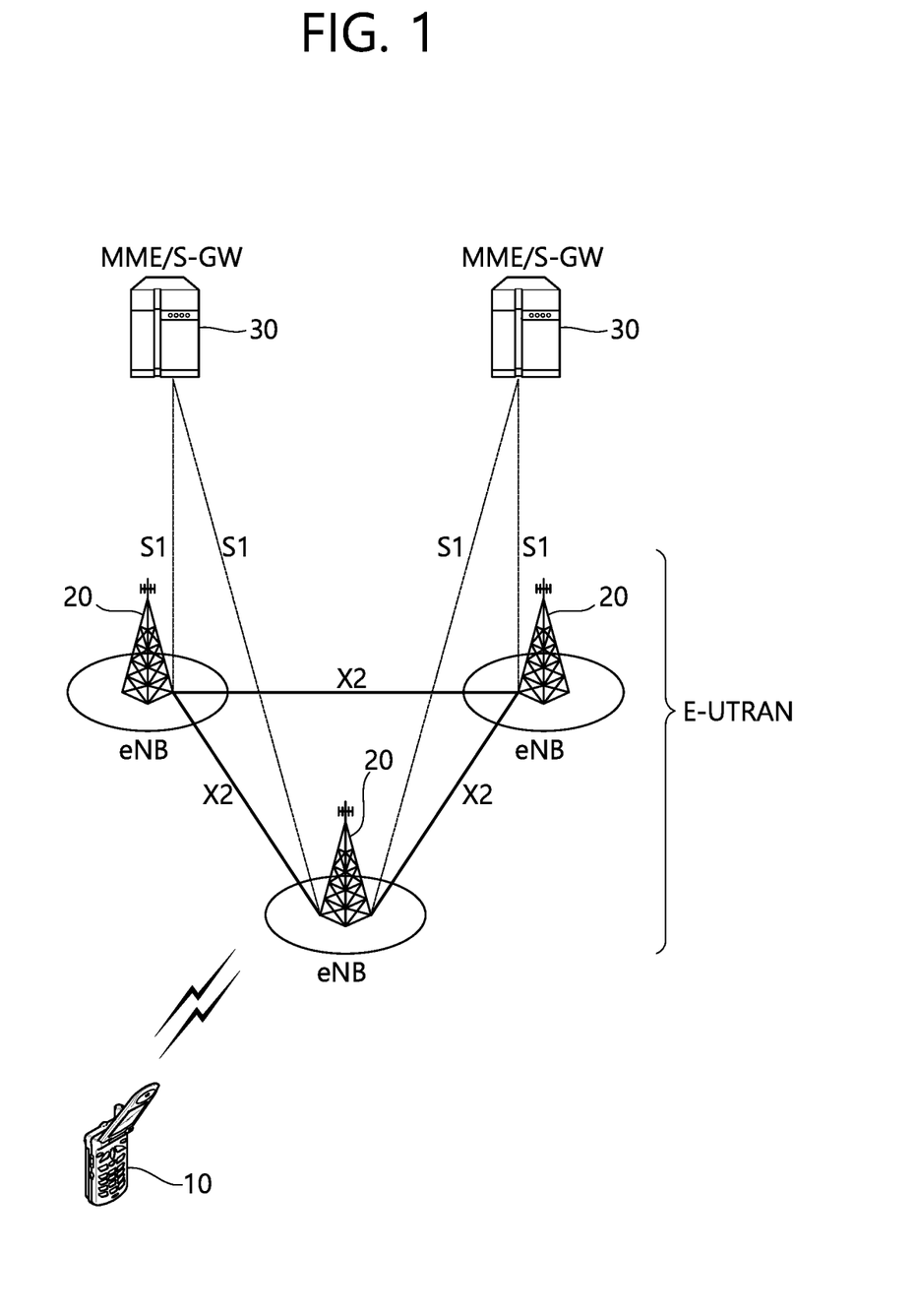
FIG. 1 shows the structure of an LTE system.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN may include at least one evolved node-B (eNB) 20, and a plurality of UEs may be present in one cell. An E-UTRAN system is a system evolved from the existing UTRAN system, and may be, for example, a 3GPP LTE/LTE-A system. The E-UTRAN consists of base stations (BSs) (or eNBs) which provide the UE with control plane and user plane protocols, and the BSs are connected through an X2 interface. An X2 user plane (X2-U) interface is defined between the BSs. The X2-U interface provides non-guaranteed delivery of a user plane packet data unit (PDU). An X2 control plane (X2-CP) interface is defined between two neighboring BSs. The X2-CP performs a function of context delivery between BSs, user plane tunnel control between a source BS and a target BS, handover-related message delivery, uplink load management, or the like. The BS is connected to the UE through a radio interface, and is connected to an evolved packet core (EPC) through an S1 interface. An S1 user plane (S1-U) interface is defined between the BS and a serving gateway (S-GW). An S1 control plane (S1-MME) interface is defined between the BS and a mobility management entity (MME). The S1 interface performs an evolved packet system (EPS) bearer service management function, a non-access stratum (NAS) signaling transport function, network sharing, an MME load balancing function, or the like. The S1 interface supports a many-to-many relation between the BS and the MME/S-GW.

The eNB 20 provides the UE with end points of the control plane and the user plane. The eNB 20 is generally a fixed station that communicates with the UE 10 and may be referred to as another terminology, such as a base station (BS), a base transceiver system (BTS), an access point, or the like. One eNB 20 may be arranged in every cell. At least one cell may be present in a coverage of the eNB 20. One cell is configured to have one of bandwidths selected from 1.25, 2.5, 5, 10, and 20 MHz, etc., and provides downlink (DL) or uplink (UL) transmission services to several UEs. In this case, different cells may be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a serving gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
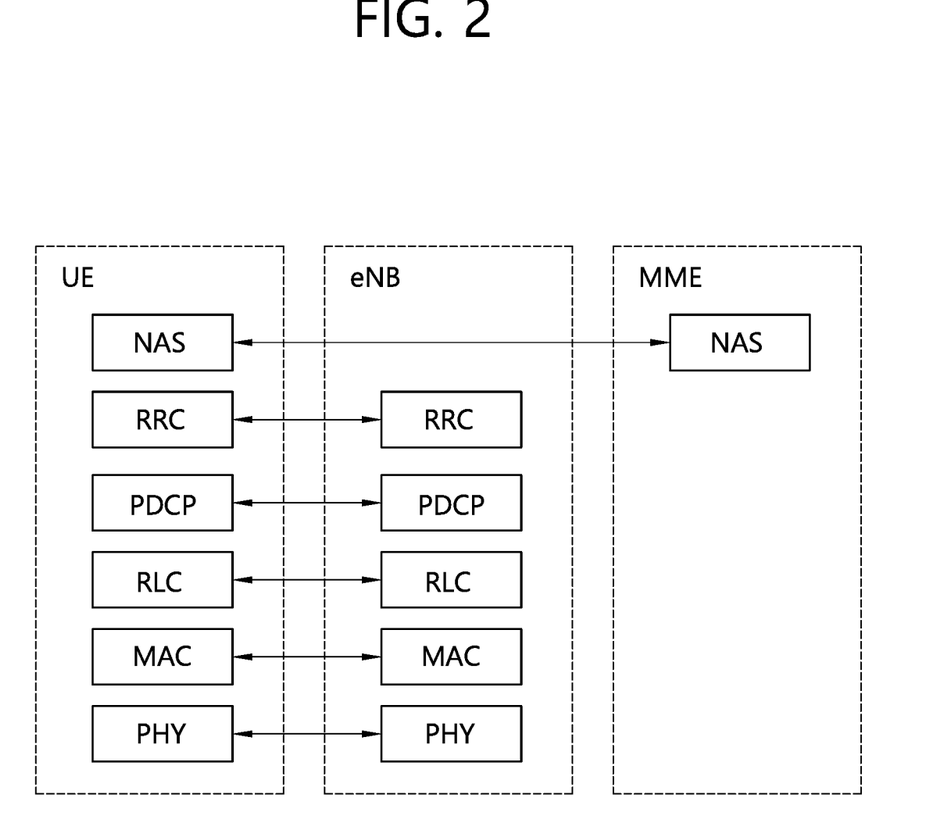
FIG. 2 shows an air interface protocol of a LTE system for a control plane.
Figure 3:
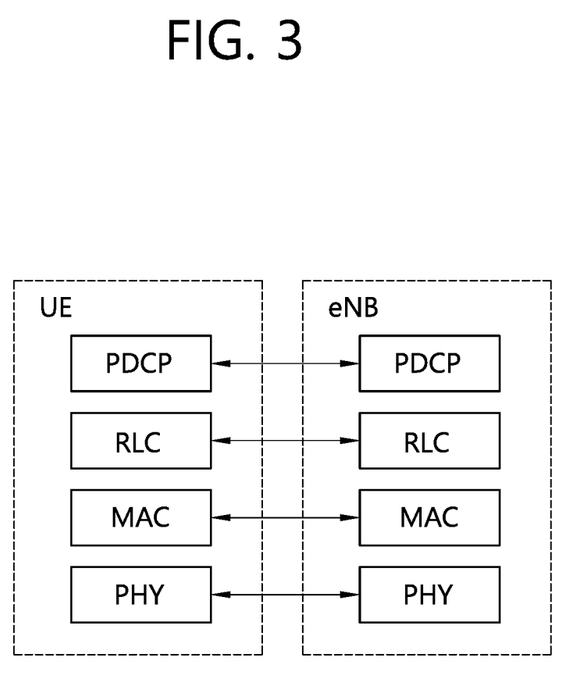
FIG. 3 shows the air interface protocol of the LTE system for a user plane.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel A physical channel is mapped to the transport channel. Data is transferred between the MAC layer and the PHY layer through the transport channel Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from a higher layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

A non-access stratum (NAS) layer belongs to an upper layer of the RRC layer and serves to perform session management, mobility management, or the like.

Hereinafter, a 5G network structure is described.

Figure 4:
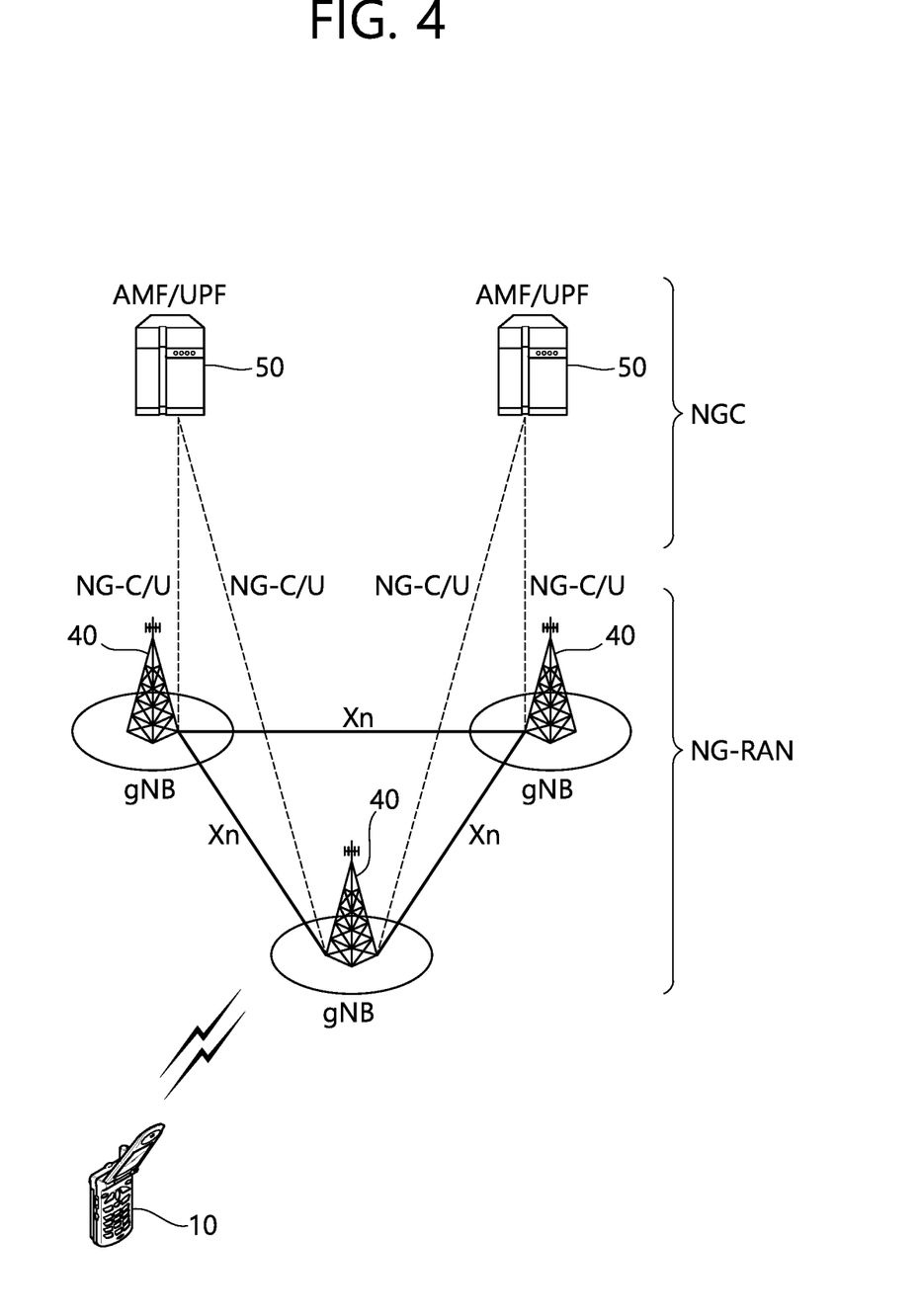
FIG. 4 shows the structure of a 5G network.

FIG. 4 shows a structure of a 5G system.

In case of an evolved packet core (EPC) having a core network structure of the existing evolved packet system (EPS), a function, a reference point, a protocol, or the like is defined for each entity such as a mobility management entity (MME), a serving gateway (S-GW), a packet data network gateway (P-GW), or the like.

On the other hand, in case of a 5G core network (or a NextGen core network), a function, a reference point, a protocol, or the like is defined for each network function (NF). That is, in the 5G core network, the function, the reference point, the protocol, or the like is not defined for each entity.

Referring to FIG. 4, the 5G system structure includes at least one UE 10, a next generation-radio access network (NG-RAN), and a next generation core (NGC).

The NG-RAN may include at least one gNB 40, and a plurality of UEs may be present in one cell. The gNB 40 provides the UE with end points of the control plane and the user plane. The gNB 40 is generally a fixed station that communicates with the UE 10 and may be referred to as another terminology, such as a base station (BS), a base transceiver system (BTS), an access point, or the like. One gNB 40 may be arranged in every cell. At least one cell may be present in a coverage of the gNB 40.

The NGC may include an access and mobility function (AMF) and a session management function (SMF) which are responsible for a function of a control plane. The AMF may be responsible for a mobility management function, and the SMF may be responsible for a session management function. The NGC may include a user plane function (UPF) which is responsible for a function of a user plane.

Interfaces for transmitting user traffic or control traffic may be used. The UE 10 and the gNB 40 may be connected by means of a Uu interface. The gNBs 40 may be interconnected by means of an X2 interface. Neighboring gNBs 40 may have a meshed network structure based on an Xn interface. The gNBs 40 may be connected to an NGC by means of an NG interface. The gNBs 40 may be connected to an AMF by means of an NG-C interface, and may be connected to a UPF by means of an NG-U interface. The NG interface supports a many-to-many-relation between the gNB 40 and the AMF/UPF 50.

A gNB host may perform functions such as functions for radio resource management, IP header compression and encryption of user data stream, selection of an AMF at UE attachment when no routing to an AMF can be determined from the information provided by the UE, routing of user plane data towards UPF(s), scheduling and transmission of paging messages (originated from the AMF), scheduling and transmission of system broadcast information (originated from the AMF or O&M), or measurement and measurement reporting configuration for mobility and scheduling.

An access and mobility function (AMF) host may perform primary functions such as NAS signalling termination, NAS signalling security, AS security control, inter CN node signalling for mobility between 3GPP access networks, idle mode UE reachability (including control and execution of paging retransmission), tracking area list management (for UE in idle and active mode), AMF selection for handovers with AMF change, access authentication, or access authorization including check of roaming rights.

A user plane function (UPF) host may perform primary functions such as anchor point for Intra-/inter-RAT mobility (when applicable), external PDU session point of interconnect to data network, packet routing & forwarding, packet inspection and user plane part of policy rule enforcement, traffic usage reporting, uplink classifier to support routing traffic flows to a data network, branching point to support multi-homed PDU session, QoS handling for user plane, e.g. packet filtering, gating, UL/DL rate enforcement, uplink traffic verification (SDF to QoS flow mapping), transport level packet marking in the uplink and downlink, or downlink packet buffering and downlink data notification triggering.

A session management function (SMF) host may perform primary functions such as session management, UE IP address allocation and management, selection and control of UP function, configuring traffic steering at UPF to route traffic to proper destination, controlling part of policy enforcement and QoS, or downlink data notification.

Hereinafter, an RRC_INACTIVE state of a UE is described.

In the discussion on the NR standardization, an RRC_INACTIVE state (RRC inactive state) has been newly introduced in addition to the existing RRC_CONNECTED state and RRC_IDLE state. The RRC_INACTIVE state may be a concept similar to a lightly connected mode which is under discussion in LTE. The RRC_INACTIVE state is a state introduced to efficiently manage a specific UE (for example, mMTC UE). A UE in the RRC_INACTIVE state performs a radio control procedure similarly to a UE in the RRC_IDLE state in order to reduce power consumption. However, the UE in the RRC_INACTIVE state maintains a connection state between the UE and a network similarly to the RRC_CONNECTED state in order to minimize a control procedure required when transitioning to the RRC_CONNECTED state. In the RRC_INACTIVE state, a radio access resource is released, but wired access may be maintained. For example, in the RRC_INACTIVE state, the radio access resource is released, but an NG2 interface between a gNB and an NGC or an S1 interface between an eNB and an EPC may be maintained. In the RRC_INACTIVE state, a core network recognizes that the UE is normally connected to a BS.

In case of a UE in a lightly connected mode, in order to hide state transition and mobility from the core network, the MME may maintain the S1 connection of the activated UE. In other words, in case of the UE in the RRC_INACTIVE state, in order to hide state transition and mobility from the Next Generation Core (NGC), the AMF may maintain the NG connection of the activated UE.

Meanwhile, in the RRC inactive state of the NR, the UE can generate minimal signaling, minimize power consumption, and reduce resource costs in the RAN and the core network. However, in the NR, such effects can be obtained, and at the same time, the core network should maintain the NG connection corresponding to the UE in the RRC inactive state, to thereby fall into a severely overloaded state. Therefore, there is a need for an improved overload control procedure for coordinating access of an RRC inactive UE in an overloaded state.

That is, in order to prevent an overload state of the core network or cope with the overload state, it is necessary to restrict the access of the UE in the RRC inactive state. However, since the RRC inactive state is set by the base station instructing each UE, it is difficult for the core network to grasp the actual RRC state of each UE. Therefore, the core network needs to send, to the base station, an indication about whether to allow access of the UE in the RRC inactive state.

In order to solve the above problem, an access control method according to an embodiment of the disclosure will be described. In this description, Next Generation-Radio Access Network (NG-RAN) is one type of base station in NR. The NG-RAN may include one or more base stations, and the base station may be an eNB or a gNB. In addition, Next Generation Core (NGC) refers to the core network in the NR. In addition, in the present description, the base station may refer to an eNB or gNB, but may also refer to a set (NG-RAN) composed of an eNB and/or gNB. The core network may be an MME or NGC, more specifically a next generation core CP function (AMF of NGC). However, these terms are classified according to the above-described operation and function, and these terms may be changed in some cases.

As described above, in the RRC inactive state newly defined in the NR, even if the RRC connection between the UE and the base station is released, the wired connection between the base station and the core network (corresponding to both the control plane and the user plane) may be maintained. That is, as the number of UEs in an RRC inactive state increases, the number of NG connections between the base station and the core network also increases. This condition can be a heavy burden on the core network and can cause or worsen the overload condition of the core network. In general, the core network may reject the NAS request from the UE or limit the load generated at the base station in order to terminate the overload state and resume normal operation. In this case, the UE for which the NAS request is rejected is not limited to the UE in a specific RRC state. In a similar manner, in order to solve an overload condition of a core network caused or worsened by an RRC inactive UE, the core network needs to limit the load generated by the RRC inactive UE. However, since the core network cannot determine which UE is in the RRC inactive state, it is necessary to adjust the ratio of the UE in the RRC inactive state through the base station. This is because the base station can know the actual RRC state of the UE. According to an embodiment, a procedure for controlling access of a UE in which the core network is in an RRC inactive state is proposed.

Figure 5:
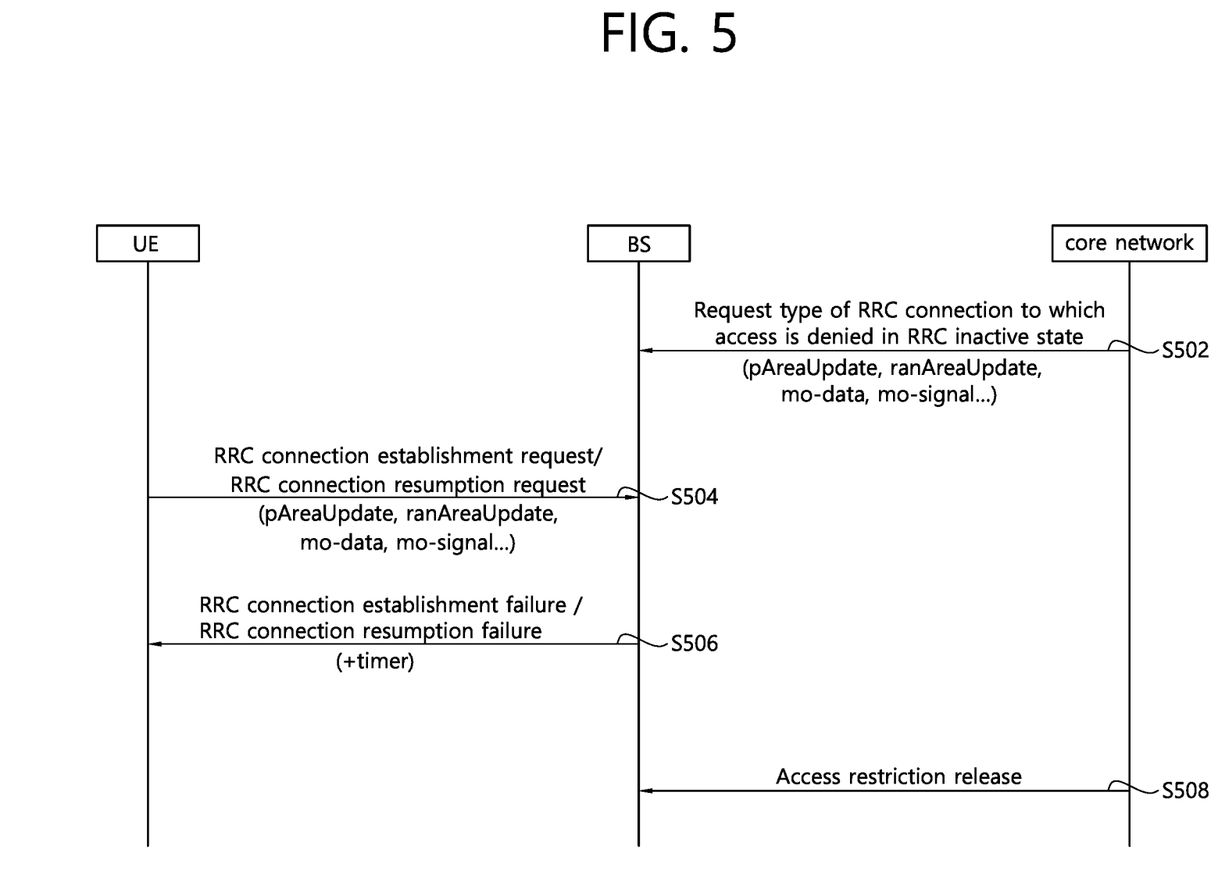
FIG. 5 is a flowchart illustrating an access control procedure according to an embodiment of the disclosure.

FIG. 5 is a flowchart illustrating an access control method according to an embodiment of the disclosure.

In step S502, the core network may transmit, to the base station, information indicating the type of the RRC connection procedure to be rejected with respect to the RRC inactive state. In detail, the core network may transmit information on the type of the RRC connection procedure to which the access is denied in the RRC inactive state, to the base station. In other words, the core network may inform the base station of the type of the RRC connection procedure for which access is restricted during the RRC connection procedure requested by the UE in the RRC inactive state. The RRC connection procedure may be an RRC connection establishment procedure or an RRC connection resumption procedure.

According to an embodiment of the disclosure, the core network may transmit a cause related to the RRC connection procedure to which the access is denied in the RRC inactive state, to the base station. For example, the core network transmits an RRC connection establishment cause or an RRC connection resume cause to the base station, so that if there is a request for establishing an RRC connection from the UE in the RRC inactive state or a request for RRC connection resumption, the core network may instruct the base station to reject the access of the UE in the RRC inactive state. RRC connection establishment cause or RRC connection resumption cause may indicate any of the following.

Paging area update (pAreaUpdate)
LAN based area update (ranAreaUpdate)
mo-data
mo-signal
early data transmission The base station may receive, from the core network, information about the type of RRC connection procedure for which access is denied in an RRC inactive state, and store the information. Subsequently, the base station may consider the information when managing access to the UE in the RRC inactive state. On the other hand, early data transmission refers to an operation of transmitting data before the RRC connection establishment is completed when the size of data to be transmitted is small. According to the early data transmission, data transmission is possible even when the UE is not in the RRC connection state.

Meanwhile, the information on the type of the RRC connection procedure for which access is denied in the above-described RRC inactive state may be transmitted to the base station through an overload start message, but is not limited thereto and may be transmitted through a separate new message.

In step S504, the UE may transmit an RRC connection request message or an RRC connection resume message to the base station. The RRC connection request message or RRC connection resume message may include RRC connection establishment cause or RRC connection resume cause associated with an RRC inactive state. That is, the RRC connection request message or the RRC connection resume message may include the RRC connection request of the UE or the cause which becomes the cause of the RRC connection resumption. The RRC connection establishment cause or RRC connection resume cause associated with the RRC inactive state may indicate any of the following.

Paging area update (pAreaUpdate)
LAN based area update (ranAreaUpdate)
mo-data
mo-signal
early data transmission Meanwhile, the RRC connection establishment cause or the RRC connection resume cause associated with the RRC inactive state may be transmitted to the base station through a new separate message as well as the RRC connection request message or the RRC connection resume message.

In step S506, after receiving the RRC connection request message or the RRC connection resume message from the UE, the base station may determine whether to allow the access of the UE in the RRC inactive state, based on the information received in step S502.

If the RRC is not allowed to access the UE in an inactive state, the base station may transmit an RRC connection rejection message or an RRC connection resumption failure message to the UE. However, in this case, the base station does not necessarily transmit the RRC connection rejection message or the RRC connection resumption failure message, but may transmit a separate new message indicating that the RRC connection establishment request or the RRC resumption request of the UE has been rejected.

If the UE rejects an access of an UE in an RRC inactive state, that is, an RRC connection establishment request or an RRC connection resumption request, the UE still remains in the RRC inactive state, but no further signaling occurs on the NG connection between the base station and the core network. This can reduce the load on the core network side. For example, when an UE in an RRC inactive state performs a paging area update, a path switch procedure may be performed, and in this case, additional signaling may occur on the NG connection. In addition, even though the UE in the RRC inactive state is located in the same LAN area, if the anchor base station is changed, it is possible to perform a path change procedure, and in this case, additional signaling may occur on the NG connection as well. In addition, when the UE in the RRC inactive state performs early data transmission, a signal may be generated on the NG connection because data of the user plane is generated. However, when the UE in the RRC inactive state restricts the establishment of the RRC connection or the resumption of the RRC connection, an additional signal on the NG connection may not be generated due to the above-described operation of the UE even in the RRC inactive state.

When a message indicating that the RRC connection establishment request or the RRC resumption request of the UE is rejected is received from the base station, the UE may stop the RRC connection establishment request or the RRC resumption request. If the timer is provided with a message indicating that the RRC connection establishment request or the RRC resumption request is rejected, the UE may stop the RRC connection establishment request or the RRC resumption request until the timer expires.

In step S508, the core network may instruct the base station to release the restriction of access to the UE in the RRC inactive state. In detail, the core network may transmit a message indicating that the overload condition has ended. When the base station receives a message indicating that the overload state has ended, it is assumed that the overload state of the core network side connected to the base station is terminated, and the existing operation may be resumed. That is, when the base station receives a message indicating that the overload state has ended, the operation of limiting the access of the UE in the RRC inactive state may no longer be performed.

Meanwhile, the message indicating that the overload state is terminated may be transmitted through an overhead stop message, but is not limited thereto and may be transmitted through a separate new message.

According to an embodiment of the disclosure, the core network may control the access of the UE in the RRC inactive state with the help of the base station without having to check whether the RRC is inactive for each UE. According to the degree of overload, the core network may adjust the rate at which the base station can establish the RRC connection or resume the RRC connection in the RRC inactive state. In this way, the core network may prevent an overload condition that may be caused by the UE in the RRC inactive state or cope with the overload condition.

Figure 6:
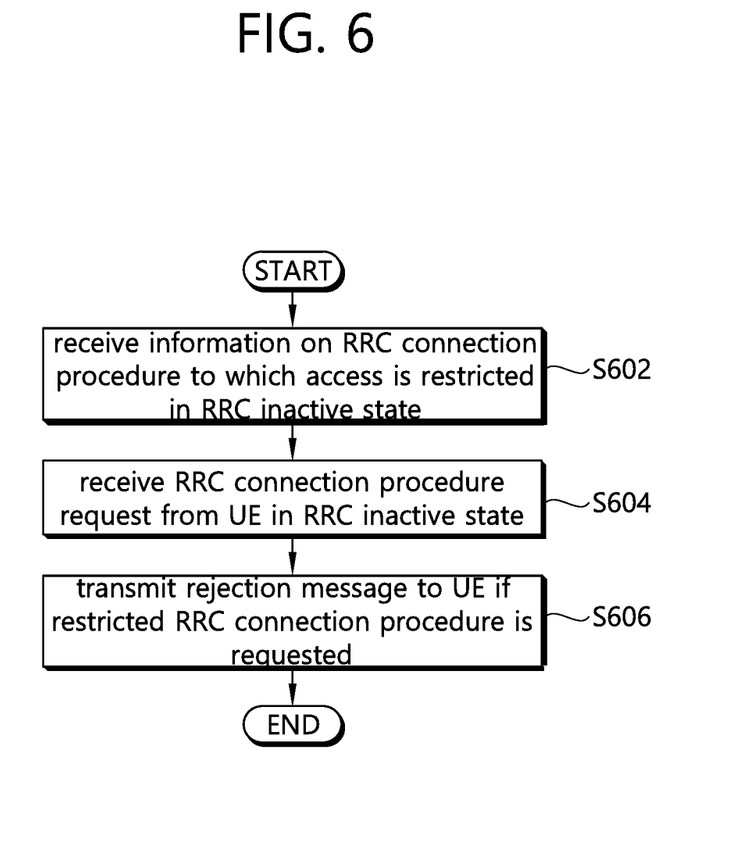
FIG. 6 is a flowchart illustrating an access control procedure according to an embodiment of the disclosure.

FIG. 6 is a flowchart illustrating an access control method according to an embodiment of the disclosure.

In step S602, the base station may receive information on the RRC connection procedure for which access in the RRC inactive state is restricted from the core network. In step S604, the base station may be requested to perform the RRC connection procedure from the UE in the RRC inactive state. In step S606, the base station may transmit a message indicating that the requested RRC connection procedure is limited to the UE, if the requested RRC connection procedure corresponds to the restricted RRC connection procedure.

The information about the restricted RRC connection procedure may include a cause value associated with the RRC connection procedure. The cause value may indicate at least one of paging area update (pAreaUpdate), RAN-based area update (ranAreaUpdate), mo-data, mo-signal, and early data transmission. The RRC connection procedure may be any one of an RRC connection establishment procedure and an RRC connection resumption procedure. After performing the step of receiving the information on the restricted RRC connection procedure, the base station may receive, from the core network, a message indicating to release the restriction of the access to the restricted RRC connection procedure. The message informing that the requested RRC connection procedure is restricted may include a timer indicating a time at which the request of the requested RRC connection procedure is stopped. The base station may be a Next Generation-Radio Access Network (NG-RAN), and the core network may be a Next Generation Core (NGC).

Figure 7:
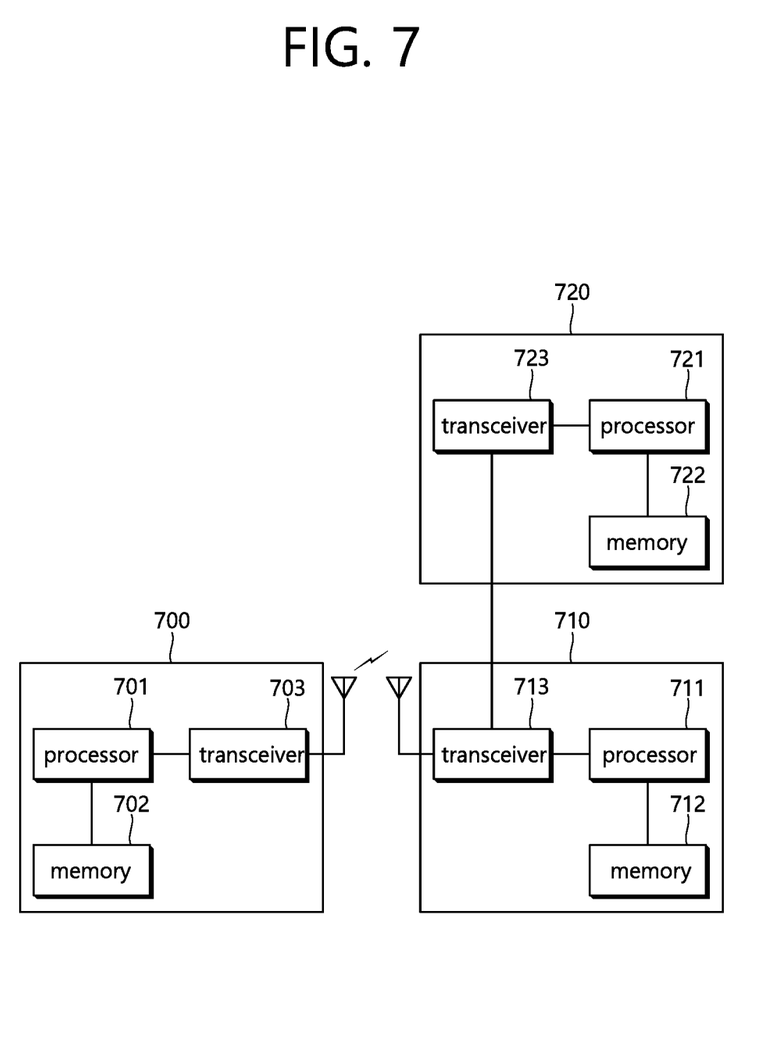
FIG. 7 is a block diagram of a communication system in which an embodiment of the disclosure is implemented.

FIG. 7 is a block diagram illustrating a wireless apparatus in which an embodiment of the disclosure can be implemented.

A first network node 700 includes a processor 701, a memory 702, and a radio frequency (RF) unit 703. The memory 702 is coupled to the processor 701, and stores a variety of information for driving the processor 701. The RF unit 703 is coupled to the processor 701, and transmits and/or receives a radio signal. The processor 701 implements the proposed functions, procedures, and/or methods. In the aforementioned embodiments, an operation of the BS may be implemented by the processor 701. In this embodiment, the first network node 700 may be the first BS in the aforementioned embodiments.

A second network node 710 includes a processor 711, a memory 712, and an RF unit 713. The memory 712 is coupled to the processor 711, and stores a variety of information for driving the processor 711. The RF unit 713 is coupled to the processor 711, and transmits and/or receives a radio signal. The processor 711 implements the proposed functions, procedures, and/or methods. The second network node 710 may be a second BS or upper layer entity, an operation of the second network node 710 or the upper layer entity in the aforementioned embodiments may be implemented by the processor 711.

The processors 711 may include application-specific integrated circuit (ASIC), other chipset, logic circuit and/or data processing device. The memories may include read-only memory (ROM), random access memory (RAM), flash memory, memory card, storage medium and/or other storage device. The RF units may include baseband circuitry to process radio frequency signals. When the embodiments are implemented in software, the techniques described herein can be implemented with modules (e.g., procedures, functions, and so on) that perform the functions described herein. The modules can be stored in memories and executed by processors. The memories can be implemented within the processors or external to the processors in which case those can be communicatively coupled to the processors via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

What is claimed is:

1. A method performed by a base station in a wireless communication system, the method comprising:

setting a wireless device to be in a radio resource control (RRC) inactive state, by transmitting an instruction to the wireless device for releasing a radio resource between the base station and the wireless, while maintaining a wired connection for the wireless device between the base station and a core network;

receiving, from the core network, an overload start message including restriction information informing the base station that an RRC connection procedure with a restricted cause value is not allowed for wireless devices in an RRC inactive state;

storing the restriction information upon receiving the overload start message;

receiving, from the wireless device in the RRC inactive state, an RRC connection resume request message including a specific cause value for a specific RRC connection procedure;

determining whether the specific RRC connection procedure is allowed, based on the specific cause value being mapped to the restricted cause value;

based on a determination that the specific RRC connection procedure is not allowed, transmitting, to the wireless device, a message informing the wireless device that the specific RRC connection procedure is restricted, wherein the message includes a timer informing the wireless device when the performance of the specific RRC connection procedure is restricted;

receiving, from the core network, an overload stop message informing the base station that an RRC connection procedure with the restricted cause value is allowed for wireless devices in the RRC inactive state;

receiving, from the wireless device in the RRC inactive state, another RRC connection resume request message including the restricted cause value for another RRC connection procedure, after receiving the overload stop message;

performing the other RRC connection procedure; and
resuming an RRC connection between the wireless device and the base station,
wherein the restricted cause value includes at least one of a paging area update (pAreaUpdate), a RAN-based area update (ranAreaUpdate), mo-data, mo-signal, and early data transmission.

2. The method of claim 1, wherein the specific RRC connection procedure is an RRC connection resumption procedure.

3. The method of claim 1, wherein the base station is a next-generation-radio access network (NG-RAN).

4. The method of claim 1, wherein the core network is a next generation core (NGC).

5. The method of claim 1, wherein the UE communicates with at least one of a mobile terminal, a network or autonomous vehicles other than the UE.

6. A base station in a wireless communication system, the base station comprising:
- a memory;
- a transceiver; and
- a processor configured to operatively connect the memory with the transceiver, wherein the processor is configured to:
- set a wireless device to be in a radio resource control (RRC) inactive state, by transmitting an instruction to the wireless device for releasing a radio resource between the base station and the wireless, while maintaining a wired connection for the wireless device between the base station and a core network;
- receive, from the core network, an overload start message including restriction information informing the base station that an RRC connection procedure is not allowed for wireless devices in an RRC inactive state with a restricted cause value;
- store the restriction information upon receiving the overload start message;
- receive, from the wireless device in the RRC inactive state, for an RRC connection resume request message including a specific cause value a specific RCC connection procedure;
- determine whether the specific RRC connection procedure is allowed, based on the specific cause value being mapped to the restricted cause value;
- based on a determination that the specific RRC connection procedure is not allowed, transmit, to the wireless device, a message informing the wireless device that the specific RRC connection procedure is restricted, wherein the message includes a timer informing the wireless device when the performance of the specific RRC connection procedure is restricted;
- receive, from the core network, an overload stop message informing the base station that an RRC connection procedure with the restricted cause value is allowed for wireless devices in the RRC inactive state;
- receive, from the wireless device in the RRC inactive state, another RRC connection resume request message including the restricted cause value for another RRC connection procedure, after receiving the overload stop message;
- perform the other RRC connection procedure; and
- resume an RRC connection between the wireless device and the base station,
- wherein the restricted cause value includes at least one of a paging area update (pAreaUpdate), a RAN-based area update (ranAreaUpdate), mo-data, mo-signal, and early data transmission.

7. The base station of claim 6, wherein the specific RRC connection procedure is an RRC connection resumption procedure.

8. The base station of claim 6, wherein the base station is a next-generation-radio access network (NG-RAN).

* * * * *